April 17, 1945.  E. A. MOLLENHAUER  2,374,117
BRAKE
Filed Feb. 23, 1944   2 Sheets-Sheet 1
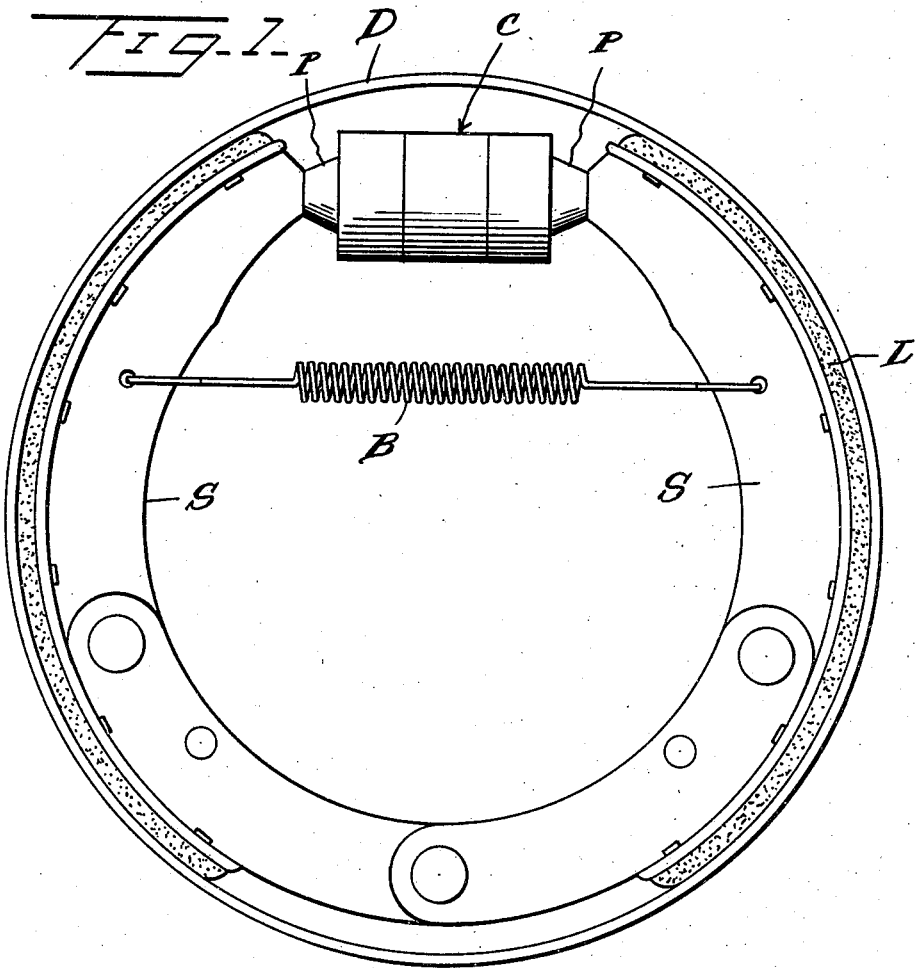
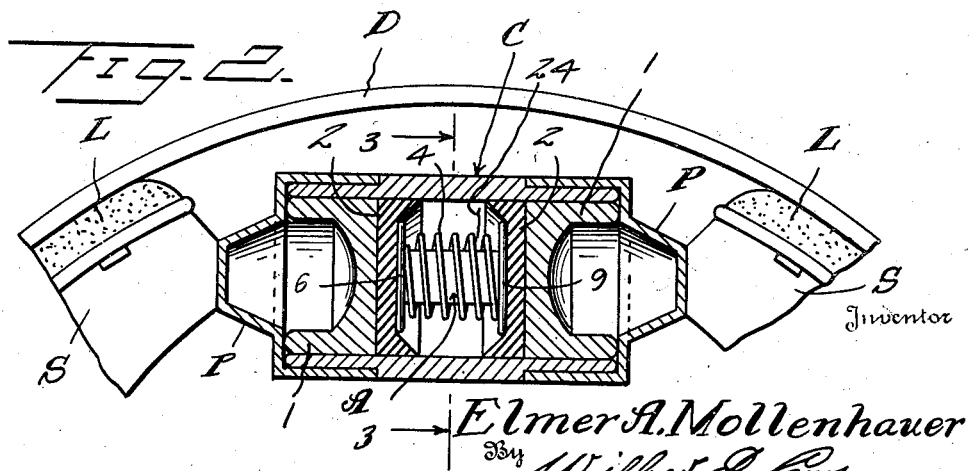
Elmer A. Mollenhauer
By Wilfred E. Lawson
Attorney April 17, 1945.  E. A. MOLLENHAUER  2,374,117
BRAKE
Filed Feb. 23, 1944   2 Sheets-Sheet 2
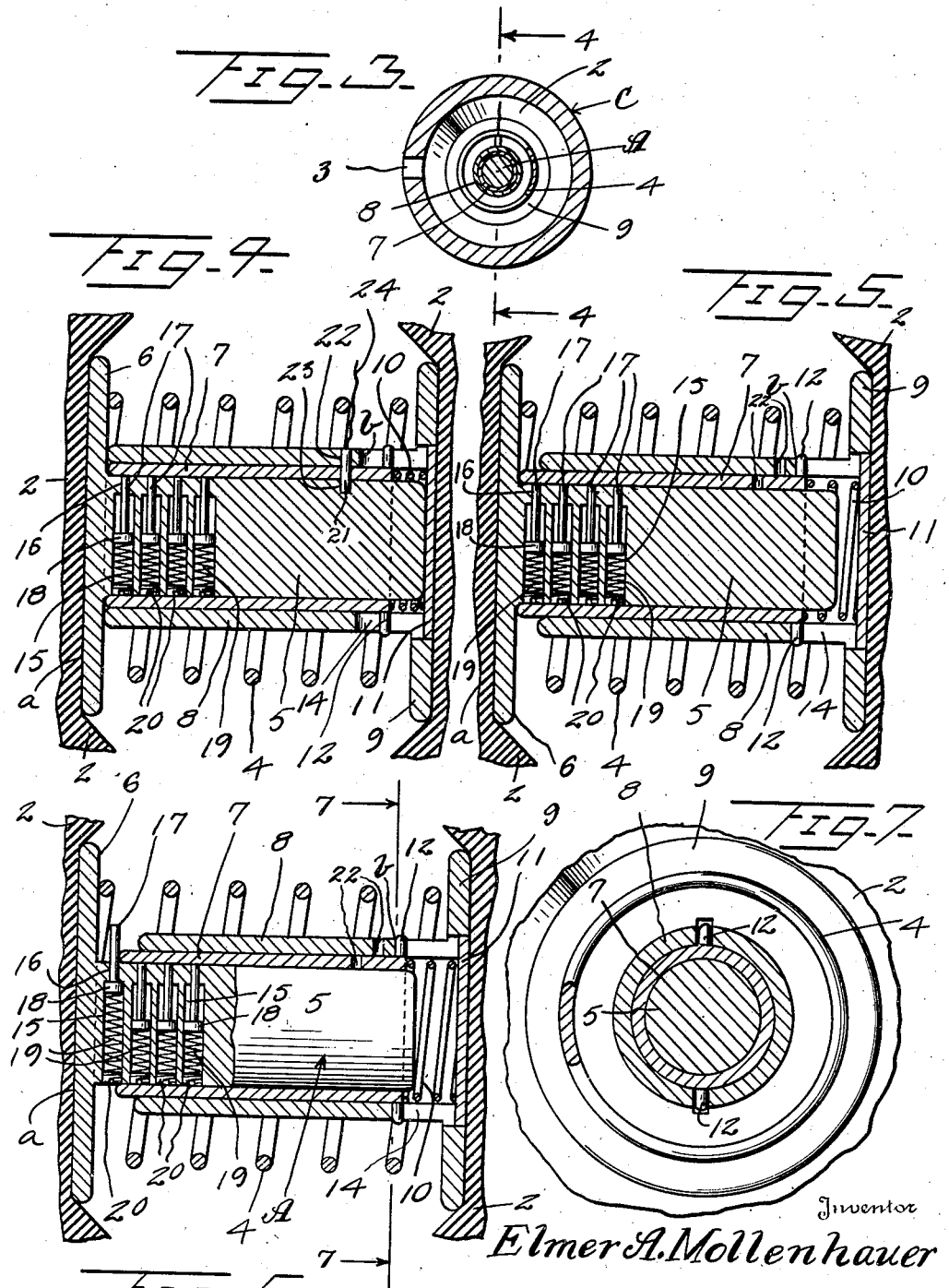
Inventor
Elmer A. Mollenhauer
By Wilfred E. Lawson
Attorney Patented Apr. 17, 1945

2,374,117

UNITED STATES PATENT OFFICE 2,374,117

BRAKE

Elmer A. Mollenhauer, Spokane, Wash., assignor of one-half to R. Guy Buchanan, Spokane, Wash.

Application February 23, 1944, Serial No. 523,568

6 Claims. (Cl. 188—79.5)

This invention relates to brakes and it is primarily an object of the invention to provide means to take up automatically excessive clearance between the drum and shoes such as comprised in the general type of hydraulically operated vehicle brakes.

A more particular object of the invention is to provide means entirely within the wheel cylinder of a hydraulic brake system for automatically adjusting the brake shoes with respect to their associated drum and wherein such means functions at all times without requiring manual adjustments.

The invention also has for an object to provide a slack adjuster for a hydraulic brake system for placement within a wheel cylinder of the system and in such position to operate in oil at all times and thus materially increase the life of the adjuster.

The invention also has for an object to provide means for automatically maintaining the brake shoes of a hydraulic brake system adjusted at all times at the proper clearances with respect to the brake drums and wherein such means includes a slack adjuster positioned as a separate unit within each of the wheel cylinders of the brake system and wherein each of said slack adjusters or units operates entirely separate and distinct from any of the other slack adjusters or units within other of the wheel cylinders of the system.

The invention consists in the details of construction and in the combination and arrangement of the several parts of my improved brake whereby certain important advantages are attained, as will be hereinafter more fully set forth.

In order that my invention may be better understood, I will now proceed to describe the same with reference to the accompanying drawings, wherein:

Figure 1 is an elevational view and of a somewhat diagrammatic character illustrating a slack adjuster constructed in accordance with an embodiment of the invention and in applied position;

Figure 2 is an enlarged detail sectional view taken through the upper portion of Figure 1;

Figure 3 is a sectional view taken substantially on the line 3—3 of Figure 2;

Figure 4 is an enlarged fragmentary sectional view of the slack adjuster as herein embodied, with the parts in initial position;

Figure 5 is a view similar to Figure 4 but showing certain of the parts in a second position;

Figure 6 is also a view similar to Figure 4 but showing certain of the parts in a still further position; and Figure 7 is a detail sectional view taken substantially on the line 7—7 of Figure 6.

As illustrated in the accompanying drawings, D denotes a conventional brake drum with which coact the well known type of articulated brake shoes S carrying the usual type of brake linings L for direct contact with the drum D upon expansion of the shoes S.

The opposed free ends of the shoes S are contacted by the pressure caps P slidably mounted upon the opposite end portions of the wheel cylinder C suitably supported in desired position between the opposed free ends of the shoes S, as by the backing plate or cover for the drum D. The linings L of the shoes S are normally held from contact with the drum D by the brake shoe pull back or release spring B.

Working within the wheel cylinder C are the pistons 1 having their inner or opposed faces provided with the sealing cups 2. Fluid is admitted within the wheel cylinder C at a point intermediate the pistons 1, or more particularly the cups 2, through an opening 3 which has communication with a suitable conduit leading from a master cylinder as is well known in connection with hydraulic brake systems now generally in use. Interposed between the pistons 1 and more particularly the cups 2 thereof is an expansible spring 4 of requisite tension for holding the pistons 1 against displacement.

As the pistons 1 are forced outwardly under the influence of the fluid admitted within the cylinder through the opening 3, the pressure caps P will be correspondingly outwardly moved and by contact with the adjacent free extremities of the shoes S, bring the linings L into desired frictional contact with the drum D.

The foregoing structure is conventional and in its detail forms no part of the present invention.

Entirely housed within the wheel cylinder C and positioned between the cups 2 of the pistons 1 as a unit is a slack adjuster A. As is clearly shown in the accompanying drawings, this adjuster or unit A, when applied, operates entirely within oil which is of particular advantage as it is assured that the life of the adjuster unit A will be materially prolonged.

The adjuster or unit A, as herein embodied, comprises an elongated cylindrical body 5 of required length and which has its outer end $a$ flat and defined by the outstanding surrounding flat flange 6. This outer end $a$ and flange 6 are adapted to have direct contact with one of the cups 2.

Closely but freely surrounding the body 5 is an idler sleeve 7 of a length less than the length of the body 5 and closely but freely surrounding the applied idler sleeve 7 is an adjuster sleeve 8 of a length substantially equal to the length of the body 5. The outer end of the adjuster sleeve 8 is defined by an outstanding surrounding flat flange 9 for contact with the cup 2 of the second piston 1.

The flange 6 of the body 5 and the flange 9 of the adjuster sleeve 8 are maintained in contact with the cups 2 by the expansion spring 4 and cause the adjuster to follow automatically the outward movement of the pistons 1 and cups 2. An expansible member 10 is interposed between the outer end of the idler sleeve 7 and a retainer washer 11 properly fitted within the outer end of the adjuster sleeve 8. This washer 11 provides means to facilitate the desired assembly of a unit or slack adjuster.

The outer extremity of the idler sleeve 7 is provided at desired points spaced circumferentially therearound with the outwardly and radially directed pins 12 rigid with the sleeve 7. These pins 12 work within the longitudinally disposed slots 14 provided in the outer end portion of the adjuster sleeve 8, whereby the sleeve 8 is allowed a limited extent of outward endwise movement independently of the idler sleeve 7, the extent of such outward independent movement being limited by contact with the inner ends b of the slots 14 with the pins 12. The slots 14 extend through the collar 9 and have their outer ends open.

The body 5 at the end portion thereof immediately adjacent to the flange 6 is provided therealong with the longitudinally spaced and radially disposed sockets 15, the inner ends of which have in communication therewith the restricted openings 16 in which freely move the outer end portions of the elongated adjuster pins 17.

The inner end portion of each of these pins 17 carries a head 18 which closely fits within a socket 15, and within the socket 15 and bearing against the head 18 is an expansible member 19 of requisite tension, herein disclosed as a coil spring. The outer end of the socket 15, as herein disclosed, is closed by a removable plug 20 with which the expansible member 19 directly engages, although this arrangement may be varied as desired.

The springs 19 constantly urge outwardly the pins 17 but in the initial assembly of the unit or adjuster these pins 17 are held retracted within the body 5 by the idler sleeve 7 which, in the initial assembly, has its inner end portion overlying the outer extremities of all of the pins 17. This initial assembly of the adjuster or unit is maintained by a pin 21 which is freely inserted through the sleeves 7 and 8 as afforded by the properly positioned openings 22 and which openings 22 in the initial assembly of the adjuster or unit are in register and also in register with a recess 23 in the periphery of the body 5 in which is received the inserted end portion of the applied holding pin 21.

The outer end of this applied pin 21 has suitably secured thereto a link tag wire 24. This tag wire 24 is of a length to extend out through the air bleed opening 25 and through which the pin 21 will also pass so that said wire and pin can be readily withdrawn after the slack adjuster or unit has been replaced. It will be obvious that the tag wire 24 and pin 21 can be readily threaded from within through the usual air bleed opening, not shown, at the time the slack adjuster or unit is being applied within the cylinder C.

When the slack adjuster or unit is in applied or working position, the expansible member 4 is interposed between and bears against the flanges 6 and 9 so that there is a constant outward pressure imposed thereon. As the linings L of the shoes S wear, there will be a relative outward longitudinal movement between the body 5 and sleeve 8 but during such initial relative endwise movement between the body 5 and sleeve 8, the idler sleeve 7 will be held against endwise displacement along the body 5 by the spring 11. However, as the inner ends b of the slots 14 contact with the pins 12, the continued relative outward movement between the body 5 and sleeve 8 will result in the inner end of the sleeve 8 and the adjacent inner end of the sleeve 7 freeing the innermost pin 17 which will then move outwardly under action of its spring 19 to lock the body member 5 and the sleeve 8 against relative inward endwise movement. As the linings L continue to move, this operation will be repeated, resulting in the successive release of the pins 17.

It is believed to be readily apparent that by the use of the slack adjuster as herein embodied, the brake shoes S, or more particularly the linings L thereof, will automatically be kept at the proper clearance with respect to the brake drum D and as each brake cylinder has its own slack adjuster, it will be at once apparent that the brake system as a whole, the brake shoes associated with each brake drum, will be automatically adjusted to their proper clearances independently of the others. This is of advantage because if one set of brake shoes in any one of the wheels should wear more than the others, the slack adjuster or unit associated with such wheel will automatically adjust that set of shoes to the proper clearance without affecting the other wheels.

After the brake linings of a set of brake shoes become worn out, the slack adjuster has its parts so proportioned as to reach the end of its adjusting ability and, therefore, will become idle and not set the brake shoes out any farther. This is of advantage as under such condition the operator will know that the adjuster does not seem to take up the clearance between the shoes and the drum and that it is necessary to pump the brake pedal to obtain brakage. This will clearly give warning that the linings L are worn out and that the brakes S should be relined.

The idler sleeve 7, however, operates not only to allow normal travel of the device without releasing the pins 17 when the brake shoes S are adjusted to the proper clearance but this idler sleeve 7 is also employed to offset any abnormal condition of the brake drums which may be effected by heat after continued brake application causes the drum D to expand, thus necessitating the brake shoes S to travel farther to make requisite contact with the drum D. If it were not for this idler sleeve 7 holding the pins 17 in their off position while this abnormal condition exists, normal functioning of the adjuster device would occur and it would be of disadvantage upon contraction resulting from cooling of the drum.

The slots 14 in the sleeve 8 are so calibrated as to allow this sleeve 8 to travel its normal distance plus the extra distance which may be caused by the expanded drum before the inner ends of the slots 14 contact the lugs 12 of the idler sleeve 7 to pull the idler sleeve 7 to uncover or release the pins 17 for the desired automatic adjustment.

It is believed to be readily apparent that if no allowance was made to compensate for the drum expansion caused by heat, there would be probability of the device being set up a notch while the drum is in this expanded condition and upon cooling of the drum and its return to normal size, the brake shoes S would be too tight and thus cause the brake to drag or even lock. It is, therefore, an essential purpose of the sleeve 7 to control the adjusting device in a manner to prevent setting itself during this abnormal drum condition.

From the foregoing description it is thought to be obvious that a brake constructed in accordance with my invention is particularly well adapted for use by reason of the convenience and facility with which it may be assembled and operated.

What is claimed is:

1. A slack adjuster for use in a hydraulic braking system including a wheel cylinder and opposed pistons working in such cylinder and operatively connected with the brake shoes, comprising a plurality of members assembled between the pistons of the cylinder for relative endwise movement, means constantly urging relative outward movement of such members to follow the movements of the pistons, and a series of spring actuated latching elements carried by one member for movement perpendicular to the line of movement of the members for progressively limiting relative inward movement of such members after said members have had predetermined relative separatory outward movement.

2. A slack adjuster for placement between the pistons working within a wheel cylinder of a hydraulic brake system to automatically take up the wear of the brake shoes, comprising two telescopic members, the outer ends of each having contact with the pistons, means for constantly urging said members in such contact and to effect relative outward movement of such members, and separate and independently acting elements carried by one of said members at spaced points longitudinally therealong for successive coaction with the second member to prevent relative inward movement of said members.

3. A slack adjuster for placement within a wheel cylinder of a hydraulic brake system, comprising an elongated member, an idler sleeve surrounding said member and having movement lengthwise thereof, a second sleeve surrounding the idler sleeve and having independent movement lengthwise thereof, means for imposing relative outward movement to the member and second sleeve, coacting means carried by the sleeves to provide means to allow the second sleeve to have initial outward movement independently of the first sleeve, said means also operating to lock the two sleeves at such initial relative movement, and holding elements carried by the member at points spaced therealong, said elements being successively released upon relative outward movement of the sleeves and the member to engage one of the sleeves to hold the sleeves and member against relative inward movement.

4. A slack adjuster as set forth in claim 3, wherein the elements each comprise a spring-pressed pin disposed radially within the member, said pins being initially held depressed by the first sleeve but progressively released upon relative outward movement of the sleeves and member.

5. In a hydraulic brake, including a piston cylinder and a pair of pistons disposed in the cylinder to be forced apart by fluid introduced under pressure therebetween; a slack adjuster comprising two telescopically assembled members interposed between the pistons, means normally urging outward separatory movement of the members and maintaining an outer end of each member against a piston, a plurality of independently operating latching elements carried by one of the members and arranged to be successively brought into operation upon relative separatory movement of the members, and means for restraining the actuation of the latching elements for a prescribed relative outward movement of the members.

6. A hydraulic brake slack adjuster as set forth in claim 5, in which said restraining means comprises a sleeve interposed between the telescopically joined members, means yieldingly maintaining said sleeve in a position to restrain said latching members, and means establishing an operative coupling between the sleeve and one of the telescopically joined members upon a predetermined relative outward movement of the members to effect shifting of the sleeve against the said yieldable means and the release of a latching element.

ELMER A. MOLLENHAUER.